(12) United States Patent
Niazi et al.

(10) Patent No.: US 6,532,473 B2
(45) Date of Patent: Mar. 11, 2003

(54) DATA FILE PROCESSING

(75) Inventors: Uzair Ahmed Niazi, Isleworth (GB); Andrew Richard Rundell, San Francisco, CA (US)

(73) Assignee: Oracle Corporation, Redwood Shores, CA (US)

( * ) Notice: Subject to any disclaimer, the term of this patent is extended or adjusted under 35 U.S.C. 154(b) by 288 days.

(21) Appl. No.: 09/730,827

(22) Filed: Dec. 7, 2000

(65) Prior Publication Data

US 2002/0013791 A1 Jan. 31, 2002

(30) Foreign Application Priority Data

Jun. 6, 2000 (GB) ................................. 0013809

(51) Int. Cl.[7] .............................................. G06F 17/30
(52) U.S. Cl. ................................................. 707/103 X
(58) Field of Search ............................. 707/103, 104.1, 707/5, 4, 501, 526, 530

(56) References Cited

U.S. PATENT DOCUMENTS

| | | | | |
|---|---|---|---|---|
| 5,855,015 A | * | 12/1998 | Shoham | .......................... 707/5 |
| 6,121,963 A | * | 9/2000 | Ange | ........................ 707/500.1 |
| 6,192,383 B1 | * | 2/2001 | Cragun | .......................... 707/513 |
| 6,440,068 B1 | * | 8/2002 | Brown et al. | ............... 600/300 |
| 6,466,940 B1 | * | 10/2002 | Mills | ........................... 707/102 |

\* cited by examiner

Primary Examiner—Safet Metjahic
Assistant Examiner—Sana Al-Hashemi
(74) Attorney, Agent, or Firm—Swidler Berlin Shereff Friedman, LLP

(57) ABSTRACT

The present invention relates to a method of processing data files which are generated in accordance with different protocols. Each protocol defines a number of mark-up tags and each data file includes a number of respective mark-up tags, each mark-up tag having respective data associated therewith. The method including storing the data contained in a data file by receiving the data file, determining the protocol definition, and using the protocol definition to determine storage location(s) or processing action(s) for each of the mark-up tags of the data file. Once this has been done the protocol definition is used to determine contextual information for each of the mark-up tags of the data file. The marked up data contained within the data file is then extracted and, stored or processed in accordance with the determined contextual information and at least one of the storage location(s) or the processing action(s).

12 Claims, 2 Drawing Sheets

DATA FILE PROCESSING

FIELD OF THE INVENTION

The present invention relates to a method and apparatus for processing data files, the data files being generated in accordance with different protocols. In particular, the present invention relates to the generation of and reading of XML (eXtensible Mark-up Language) files generated in accordance with different document structures (e.g. DTD's, schemas).

DESCRIPTION OF THE PRIOR ART

XML is a mark-up language which is used for transferring structured data. The XML files include a number of mark-up tags (e.g. "elements", "attributes" and "entities" etc.) which are associated with respective data. Each respective mark-up tag has a specific meaning within the context of the particular XML file and this allows third parties to determine the nature of the data associated with the respective mark-up tags.

The mark-up tags associated with an XML file are defined by the XML document type definition or schema. This leads to a large number of different file formats being available, which in turn leads to many problems with the extraction and storage of data from the files.

Currently, data is extracted from XML files by parsing the file to locate specific mark-up tags and then extracting and storing the corresponding data accordingly. However, a respective data loader must be provided for each specific type of XML file. As a result a large number of different data loaders can be required for extracting and storing data from a number of different XML files.

As the use of electronic information interchange increases rapidly, users are now desiring that data is transferred to and from the systems in a variety of XML formats. Accordingly, it is desirable to be able to process different XML file formats using a single piece of software.

SUMMARY OF THE INVENTION

In accordance with a first aspect of the present invention, we provide a method of processing data files, the data files being generated in accordance with different protocols, each protocol defining a number of mark-up tags and each data file including a number of respective mark-up tags, each mark-up tag having respective data associated therewith, at least some of the data files also including a protocol definition indicating the protocol used to generate the data file, wherein the method comprises storing the data contained in a data file by:

a. receiving the data file;
b. determining the protocol definition;
c. using the protocol definition to determine storage location(s) or processing action(s) for each of the mark-up tags of the data file;
d. using the protocol definition to determine contextual information for each of the mark-up tags of the data file;
e. extracting the marked up data contained within the data file; and,
f. storing or processing the data in accordance with the determined contextual information and at least one of the storage location(s) or the processing action(s).

In accordance with a second aspect of the present invention, we provide apparatus for processing data files, the data files being generated in accordance with different protocols, each protocol defining a number of mark-up tags and each data file including a number of respective mark-up tags, each mark-up tag having respective data associated therewith, at least some of the data files also including a protocol definition indicating the protocol used to generate the data file, the apparatus comprising:

a. a processor; and,
b. a store, the processor being adapted to storing data contained in a data file by:
   i. receiving the data file;
   ii. determining the protocol definition;
   iii. using the protocol definition to determine storage location(s) or processing action(s) for each of the mark-up tags of the data file;
   iv. using the protocol definition to determine contextual information for each of the mark-up tags of the data file;
   v. extracting the data contained within the mark-up tags of the data file; and,
   vi. storing or processing the data in accordance with the determined contextual information and at least one of the storage location(s) or the processing action(s).

Accordingly, the present invention provides a method and apparatus for storing data contained in a data file, and in particular a structured data file. The system operates by examining the data file to determine a protocol definition which is then used to determine contextual information and storage location(s) (also referred to as locational information) or processing action(s) for each of the marked-up tags in the data file. The data associated with the marked-up tags is then stored or processed in accordance with this contextual information and the storage location(s) or processing action(s), as appropriate. As the protocol definition is different for each different type of data file, different mark-up tags contained in different types of data file can resolve to the same contextual information and storage location(s) or processing action(s) allowing the data to be stored or processed in the same way irrespective of the type of data file.

If the data file does not include a protocol definition, then the method of determining contextual and locational information for each of the mark-up tags of the data file typically comprises parsing the data file to locate the mark-up tags and thus generating a protocol definition for use with this file, considering each mark-up tag and the data associated therewith to determine contextual and locational information for each of the mark-up tags. Accordingly, if no protocol definition can be generated to determine contextual information, it is then necessary to look at each of the mark-up tags and the data contained therein to determine the contextual and locational information directly.

Typically, when no protocol definition is available or can be generated the contextual and locational information is determined by requesting the input of contextual and locational information from an external source, such as the user. Thus, the user of the apparatus and/or method would examine the data and the mark-up tags and use their own knowledge of the database receiving system and the way in which data is stored therein to determine the contextual and locational information appropriate to the given data.

Once this has been completed, a protocol definition can then be defined for the mark-up tags for which contextual and locational information has been derived. This can then be used in subsequent processing of data files.

In accordance with a third aspect of the present invention, we provide a method of processing data files, the data files being generated in accordance with different protocols, each protocol defining a number of mark-up tags and each data file including a number of respective mark-up tags, each mark-up tag having respective data associated therewith, at least some of the data files also including a protocol definition indicating the protocol used to generate the data file, wherein the method comprises generating a data file by:

a. determining the protocol definition of the protocol to be used;
b. locating the data to be incorporated into the file, the data being stored in accordance with contextual and locational information;
c. using the protocol definition and the contextual information to determine the mark-ups with which the data should be associated;
d. generating a data file by associating the data with respective mark-up tags in accordance with the contextual and locational information.

In accordance with a fourth aspect of the present invention, we provide apparatus for processing data files, the data files being generated in accordance with different protocols, each protocol defining a number of mark-up tags and each data file including a number of respective mark-up tags, each mark-up tag having respective data associated therewith, at least some of the data files also including a protocol definition indicating the protocol used to generate the data file, the apparatus comprising:

a. a processor; and,
b. a data dictionary, the processor being adapted to generate data files by:
 i. determining the protocol definition of the protocol to be used;
 ii. locating the data to be incorporated into the file, the data being stored in accordance with contextual information;
 iii. using the protocol definition and the contextual and locational information to determine the mark-up tags with which the data should be associated;
 iv. generating a data file by associating the data with respective mark-up tags in accordance with the contextual and locational information.

Accordingly, the present invention also provides a method and apparatus for generating the data files. This is achieved by using stored protocol definitions, and the corresponding locational information of the data to be incorporated into the file, to determine the respective mark-up tags which should be used for generating the file and the data associated with them for a user determined context.

Typically the first, second, third and fourth aspects of the present invention use the protocol definition to access a data dictionary, the data dictionary including an indication of the locational or processing information for each of the mark-up tags. This provides a simple method of locating the locational information for each of the mark-up tags in the particular data file.

However, alternatively for example, the locational information may be associated with a data file itself, for which a corresponding protocol definition is available.

Typically in this case the data dictionary also includes an indication of the contextual information for each of the attributes as well as an indication of the specific data associated with each of the entities. However, it is not essential that each attribute and entity is defined as any undefined attribute and entities can simply be determined by requesting the information from the user of the system.

As will be understood by a person skilled in the art, the protocol is typically an extensible Mark-up Language (XML) with the protocol definition being a document definition type or schema. However, the system may also apply to other markup languages such as SGML, HTML or the like.

BRIEF DESCRIPTION OF THE DRAWINGS

An example of the present invention will now be described with reference to the accompanying drawings, in which.

DETAILED DESCRIPTION OF THE DRAWINGS

Figure 1:
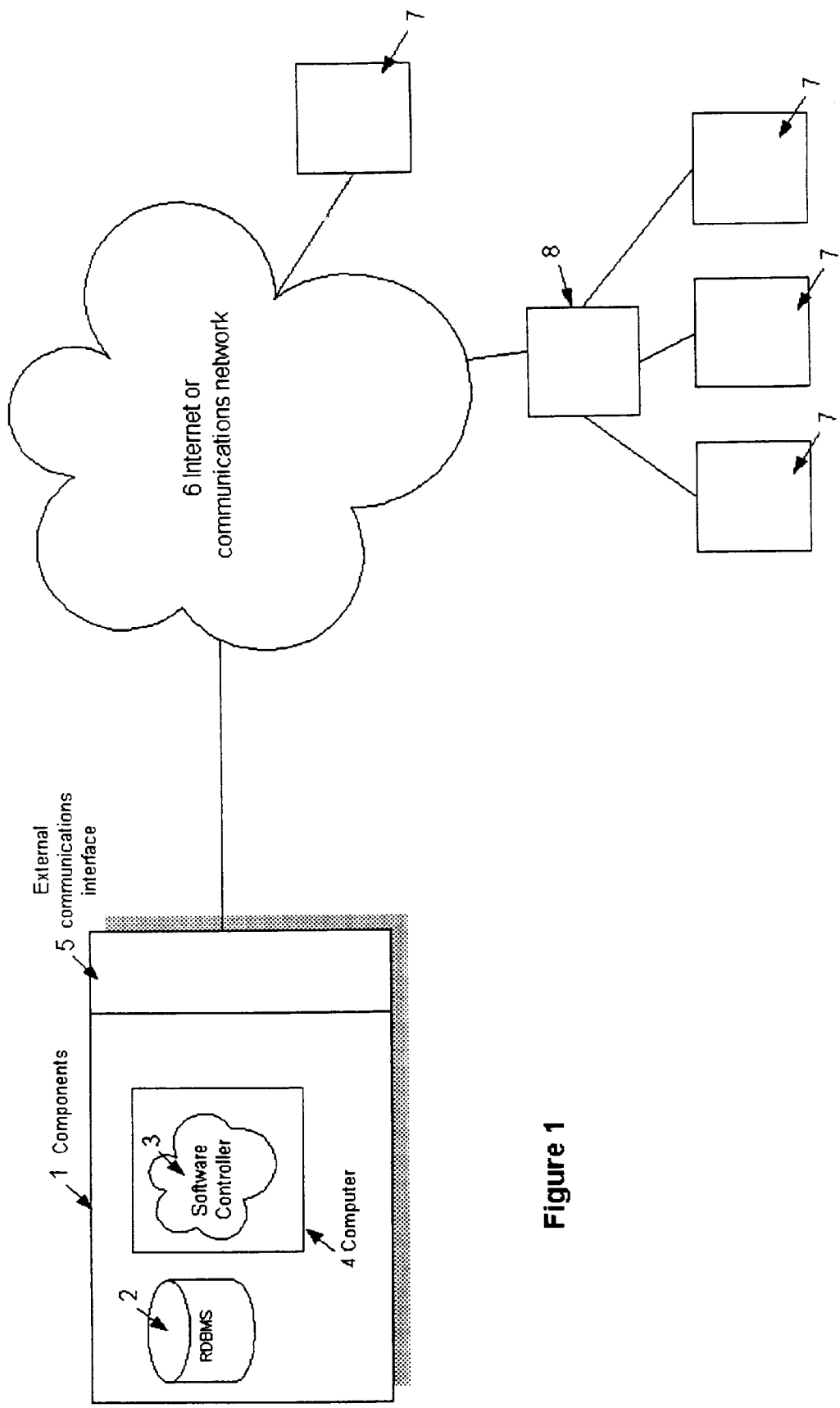
FIG. 1 is a schematic diagram of the apparatus according to the present invention; and, FIG. 2 is a schematic diagram of the contexts of the repository of FIG. 1.

FIG. 1 shows an end station 1 adapted for implementing the present invention. The end station 1 includes a repository 2 which is connected to a software controller 3, such as a computer processing system or the like. The repository and the software controller are connected to a communications network 6, which in this example is the Internet, via an external communications interface, a modem, ISDN connection or the like 5.

As shown in FIG. 1, similar systems can be implemented by end stations 7 positioned at remote locations, such as at client locales, which are also connected to the Internet. The connection can be either direct, or via communications centers, for example Internet Service Providers (ISPs) 8.

For the purposes of this example, a two-way dialogue is envisioned between a motor parts manufacturer (the end station 1) and motor parts clients (the remote locations 7).

In use, XML files are transferred between the end stations 1, 7 via the Internet 6. The software controller 3, in accordance with the present invention, can process a delivered XML file.

The software controller 3 can operate in a number of modes:

i. processing data contained within XML files obtained from other sites;
ii. generating XML files for processing at other sites with valid installations of the present invention;
iii. transforming data in the repository into other structures for presentation or other transferral purposes.

In each case, the XML file is processed, generated or transformed using rules corresponding to the XML file structure that are defined within the repository 2.

Figure 2:
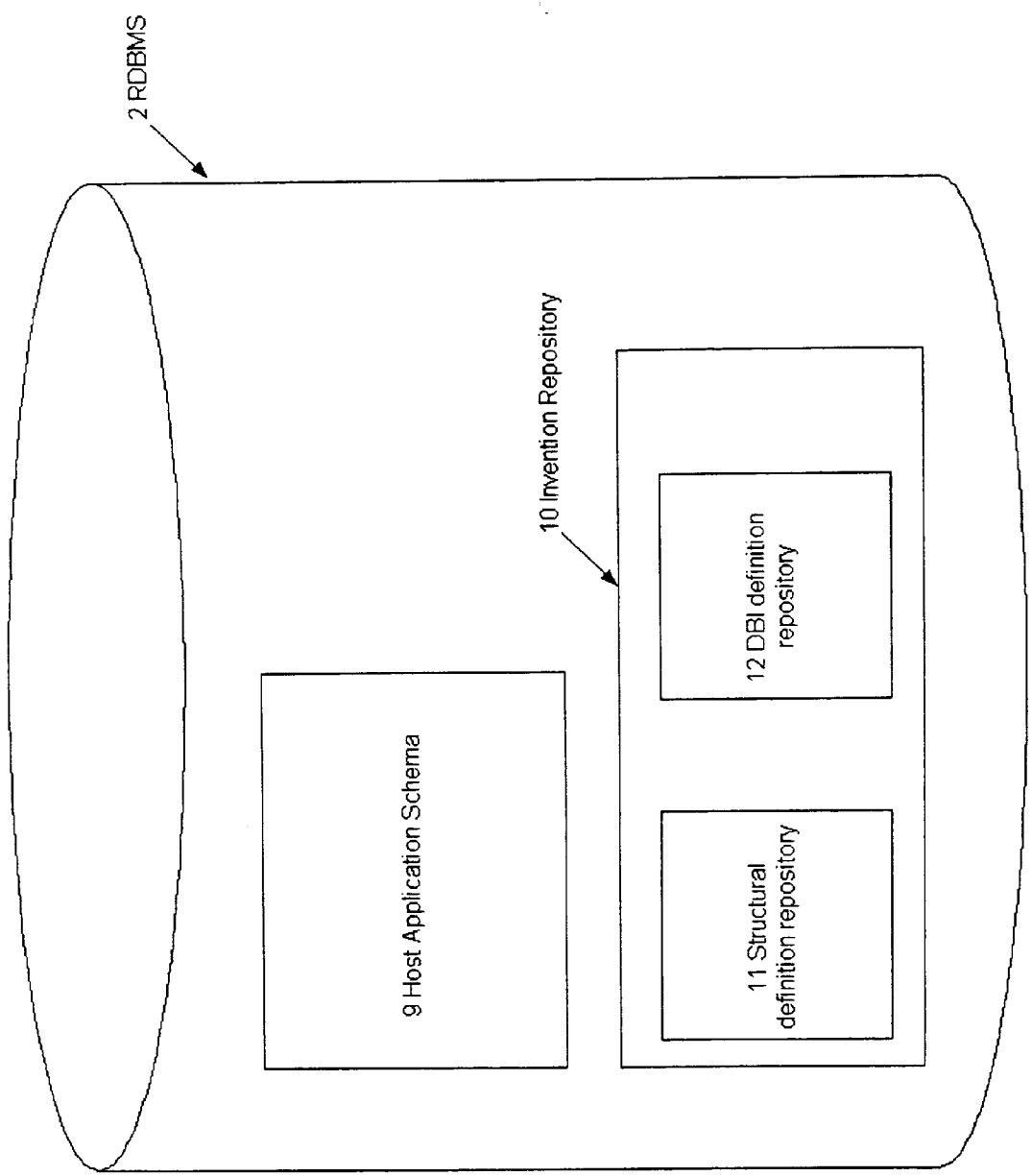

The contents of the repository 2 are represented schematically in FIG. 2. The repository is typically a relational database, and will contain a minimum of two relational database schemas: the host application schema 9, and the invention data dictionary 10.

The host application schema 9, represents the business data operated upon by the present invention. Incoming XML files will have their associated data deposited in the host application schema, and generated XML files contain data from the host application schema.

The invention data dictionary 10, contains the structural definition repository 11, and the link between the structural definition repository 11 and the host application schema 9. This facilitates the proper processing of XML files by the software controller 3. For each installation, only one invention data dictionary 10 will be present, however several host application schemas could be in place.

As will be appreciated by a person skilled in the art, the host application schema 9 will contain a number of database tables, with associated attribution that stores the business data of this enterprise.

In this example, a motor parts manufacturer wishes to create and distribute product catalogues to clients, who in turn will integrate the parts defined in the catalogue into their order entry systems. The clients then create purchase orders through client systems. These orders are stored in the host application schema 9, and the data is used to generate XML files that contain order information and are transferred to the motor accessories manufacturer for fulfilment.

The exact details of the XML file structures are unimportant as the present invention includes a structural definition repository 11 that supports current XML standards such as XML DTDs or XML Schemas, which define the structure and markup tags used in a particular XML file.

The invention also includes a repository of locational and contextual information, known as Database Items (DBIs), termed the DBI definition repository 12. The DBIs link the XML structural definitions to the host application repositories. These DBIs ensure that processing an XML file stores the included data correctly in the receiving host application.

An example XML file, XML file 1, is shown below. This is a simplistic example for explanation purposes only.

The first line of this file identifies the file as an XML file, conforming to the 1.0 XML file standards and the text data represented in a particular character set (in this case UTF-8).

The second line of the file indicates to the XML processor the name of the this file structure, and where the corresponding file structure document can be found.

The following text is a partially representation of a motor accessories manufacturer product catalogue. Three parts are defined within the product catalogue, as well as some part attribution, e.g. the description of the part and its associated cost. Some part attributes are not required; for example, the color attribute of the starter motor is not defined. This XML file also contains entities, which are seen as having leading '&' characters, and end with semicolons.

In this example, the structure of the XML file is determined using a Document Type Definition or DTD. This DTD contains the element, attribute and entity definitions. Using DTDs, elements are defined as the tag set used to identify data within the XML file.

In the example, the elements are MotorPartCatalogue, Part, Description, Color, Material, Cost, CostUnit, CostCurrency and MinimumOrder. Attributes are used to qualify element definitions, in this example, the Part element has two attributes, ID and TYPE.

Entities are placeholders for longer text, which is often repeated throughout a document, for example, &FORD; might represent "Ford Motor Company US Incorporated". Should the manufacturer wish to change this to just "Ford", they can by changing the entity definition, and would not have to traverse any data within XML files. This example contains several entities, FORD, MUSTANGGT, BMW, GRANDT750, GMC and GRANDAMSE.

The DTD also contains the relationship between XML elements; for example, that the Color element is a child element of the Part element and that the part element can only contain one Color element. This XML structure definition be it a DTD, XML Schema or like is stored (or a representation is stored) in the invention structural definition repository 11 in order that the data contained within XML files is actioned appropriately.

XML File 1

```
<?xml version="1.0" encoding="UTF-8"?>
<!DOCTYPE MotorCatalogue SYSTEM "http://www.manufacturer.com/xml/catalogue.dtd">
<MotorPartCatalogue>
    <Part id="000001" type="Car">
        <Description>Passenger side windshield wiper blade for &FORD; &MUSTANGGT;
</Description>
        <Color>Black</Color>
        <Material>Vulcanized Rubber</Material>
        <Cost>1799</Cost>
        <CostUnit>Cent</CostUnit>
        <CostCurrency>US Dollar</CostCurrency>
        <MinimumOrder>5</MinimumOrder>
    </Part>
<Part id="000002" type="Bike">
        <Description>Electronic ignition starter motor for &BMW; &GRANDT750;</Description>
        <Material>Aluminium</Material>
        <Cost>13499</Cost>
        <CostUnit>Cent</CostUnit>
        <CostCurrency>US Dollar</CostCurrency>
        <MinimumOrder>1<MinimumOrder>
    </Part>
<Part id="000003" type="Car">
        <Description>Hood for &GMC; &GRANDAMSE;</Description>
        <Color>Specify with Order</Color>
        <Material>Steel</Material>
        <Cost>8999</Cost>
        <CostUnit>Cent</CostUnit>
        <CostCurrency>US Dollar</CostCurrency>
        <MinimumOrder>1</MinimumOrder>
    </Part>
</MotorPartCatalogue>
```

Operational mode 1 of the present invention, to receive and process XML files of the above nature, will now be described.

On receipt of the XML document, the software controller 3 analyses the XML document, looking for references to a particular structure definition, a DTD, XML Schema or the like. If a structural definition is present, the software controller 3 attempts to obtain the corresponding definition within the inventions structural definition repository 11.

If such a definition exists then the software controller 3 can parse the XML file, find the DBIs associated with each component of the XML file and use the database location specified as part of the DBI definition to store the data in the appropriate place within the host application schema 9.

In this example, assume the clients have an order entry application that stores orderable items in a series of database tables. For example, the application may have two tables, a PART_IDENTITIES table that serves for quick access to the part id, type and description and a PART_DETAILS table that contains the full details about a part. The DBIs for this example could be represented as is shown in table 1.

TABLE 1

| XML File Structure | XML File Component | DBI Representation |
|---|---|---|
| MotorPart Catalogue | Part.ID | PART_IDENTITIES:PART_ID |
| MotorPart Catalogue | Part.Type | PART_IDENTITIES:PART_TYPE |
| MotorPart Catalogue | Part.Description | PART_IDENTITIES:DESCRIPTION |
| MotorPart Catalogue | Part.Material | PART_DETAILS:MATERIAL |
| MotorPart Catalogue | Part.Cost | (PART_DETAILS:COST)/100 |
| MotorPart Catalogue | Part.CostCurrency | PART_DETAILS:CURRENCY |
| MotorPart Catalogue | Part.MinimumOrder | PART_DETAILS:MINIUMUM_ORDER |

In this case the representation of the DBIs is TABLE NAME: COLUMN NAME. The present invention does not require that all XML file components be specified in the structural definition repository 11 and the DBI definition repository 12, in which case the data embedded in those components in the XML file is ignored.

The DBIs can also be defined to execute a function on the corresponding data in the XML file. In this example, the clients application has no concept of a CostUnit, and the client system requires the price of the accessory in US Dollars. Hence, the Cost of the items is divided by one hundred before storing it in the host application schema 9.

Using the combination of stored DBIs 12 and the stored XML file structure in the structural definition repository 11, the host application tables at the client site are updated to include the data in the XML file, that is the PART_IDENTITIES table will have three new records:

TABLE 2

PART_IDENTITIES

| PART_ID | PART_TYPE | DESCRIPTION |
|---|---|---|
| 1 | Car | Passenger side wiper blade for Ford Motor Company Mustang GT Coupe 5.0 |
| 2 | Bike | Electronic Ignition for BMW Grand Tourer 750 cc |
| 3 | Car | Hood for General Motors (including Pontiac) Grand Am SE |

The PART_DETAILS table will also have three new records:

TABLE 3

PART_DETAILS

| COLOUR | MATERIAL | COST | CURRENCY | MINIMUM_ORDER | PART_ID |
|---|---|---|---|---|---|
| Black | Vulcanised Rubber | 17.99 | US Dollar | 5 | 000001 |
| | Aluminium | 134.99 | US Dollar | 1 | 000002 |
| Specify with order | Steel | 89.99 | US Dollar | 1 | 3 |

As will be understood by a person skilled in the art, the PART_ID column appears in both tables to maintain the join between PART_IDENTITIES and PART_DETAILS. The data from the XML file now exists in the client order entry host application schema 9. Therefore, the client application will now recognise these parts, and allow order entry clerks to make use of them, without the need to update the order entry application manually. This type of application-independent dynamic update will likely be the most common use of the present invention.

If the valid XML file does not contain a structural definition directive e.g. line 2 of XML file 1, then the present invention will parse the XML file to dynamically generate a structural definition which can be used to examine the data embedded within the file.

In this case, the software controller 3 examines the current set of stored structural definitions 11 for a match with the generated definition. If one exists, then it is used to process the XML file in the manner described in the example above.

Should more than one matching definition be found an external source must choose the appropriate definition such that the XML file can be processed in the manner described in the example above.

Should no definition be found, then the XML file has a structure not yet stored in the structural definition repository 11 of the present invention. The structural definition 11 and the corresponding DBI definition 12 must be supplied by an external source and stored in the appropriate repository. Once defined, the present invention can process and produce files conforming to that definition ad infinitum, without the need to perform any code modification.

An example of the operation of the end station 1 to generate an XML file using the second operational mode will now be described.

Considering an order entered at a client site. This order will exist as data held in the client order entry application schema 9. With the present invention installed at both sites, the motor accessory client can package the order (or orders) in the form of an XML file using the present invention, and transfer via it the Internet 6, to the motor accessory manufacturer.

The first stage in this process is that a structural definition must be chosen by an external source. The software controller 3, finds the DBIs associated with the chosen XML file structural definition and fetches the data from the appropriate host application schema 9 and builds up the XML file. An example of an order structural definition appears in table 4, below.

TABLE 4

| XML File Structure | XML File Component | DBI Representation |
| --- | --- | --- |
| Order | Customer.Name | ORGANIZATIONS:NAME |
| Order | Customer.DeliveryAddress | ORGANIZATIONS:ADDRESS |
| Order | Customer.InvoiceAddress | ORGANIZATIONS:ADDRESS |

TABLE 4-continued

| XML File Structure | XML File Component | DBI Representation |
| --- | --- | --- |
| Order | OrderRequest.OrderNumber | ORDERS:ORDER_ID |
| Order | OrderRequest.OrderDate | ORDERS:EFFECTIVE_DATE |
| Order | OrderRequest.OrderLine.ProductId | ORDER_ITEMS:PRODUCT_ID |
| Order | OrderRequest.OrderLine.Description | ORDER_ITEMS:DESCRIPTION |
| Order | OrderRequest.OrderLine.Quantity | ORDER_ITEMS:QUANTITY |
| Order | OrderRequest.OrderLine.Color | ORDER_ITEMS:COLOR |

The structural definition and corresponding DBI definition shown in table 4 is used by the software controller 3, to generate the XML file as shown in XML file 2.

XML File 2

```
<?xml version="1.0" encoding="UTF-8"?>
<!DOCTYPE Order SYSTEM "http://www.client.com/xml/order.dtd ">
<Order>
    <Customer>
        <Name>Joes Discount Auto Parts</Name>
        <DeliveryAddress>132 High Street, City, County, AA1 ZZ2</DeliveryAddress>
        <InvoiceAddress>132 High Street, City, County, AA1 ZZ2</InvoiceAddress>
    </Customer>
    <OrderRequest OrderNumber="#776655" OrderDate="06/28/2000">
        <OrderLine>
            <ProductId>000001</ProductId>
            <Description>Passenger side wiper blade for Ford Motor Company Mustang GT Coupe
5.0</Description>
            <Quantity>10</Quantity>
        </OrderLine>
        <OrderLine>
            <ProductId>000003</ProductId>
            <Description> Hood for General Motors (including Pontiac) Grand Am SE </Description>
            <Quantity>1</Quantity>
            <Color>Firebird Red</Color>
        </OrderLine>
    </OrderRequest>
</Order>
```

In this case, the DBIs are being used to retrieve the data from the host application schema 9 to generate XML file 2. This XML file will be transferred to the motor accessory manufacturer site, where the file will be processed in accordance with operational mode 1.

If the motor accessory manufacturer now decides to include an image of the part within the catalogue, a new XML component is added to the structural definition called "picture". The new XML file representing the catalogue is shown in XML file 3.

XML Pile 3

```
<?xml version="1.0" encoding="UTF-8"?>
<!DOCTYPE MotorCatalogue SYSTEM "http://www.manufacturer.com/xml/catalogue.dtd ">
<MotorPartCatalogue>
    <Part id"000001" type="Car">
        <Description>Passenger side windshield wiper blade for &FORD; &MUSTANGGT;
```

-continued

XML Pile 3

```
</Description>
      <Color>Black</Color>
      <Material>Vulcanized Rubber</Material>
      <Cost>1799</Cost>
      <CostUnit>Cent</CostUnit>
      <CostCurrency>US Dollar</CostCurrency>
      <MinimumOrder>5</MinimumOrder>
      <Picture>http://www.manufacturer.com/catalogue/pictures/wiper.gif</Picture>
   </Part>
<Part id="000002" type="Bike">
      <Description>Electronic ignition starter motor for &BMW; &GRANDT750;</Description>
      <Material>Aluminium</Material>
      <Cost>13499</Cost>
      <CostUnit>Cent</CostUnit>
      <CostCurrency>US Dollar</CostCurrency>
      <MinimumOrder>1</MinimumOrder>
      <Picture>http://www.manufacturer.com/catalogue/pictures/ignition.gif</Picture>
   </Part>
<Part id="000003" type="Car">
      <Description>Hood for &GMC; &GRANDAMSE;</Description>
      <Color>Specify with Order</Color>
      <Material>Steel</Material>
      <Cost>8999</Cost>
      <CostUnit>Cent</CostUnit>
      <CostCurrency>US Dollar</CostCurrency>
      <MinimumOrder>1</MinimumOrder>
      <Picture>http://www.manufacturer.com/catalogue/pictures/hood.gif</Picture>
   </Part>
</MotorPartCatalogue>
```

The end stations 7 at the remote locations will not have this new XML file component stored in the structural definition repository 11. Therefore, the invention at the remote locations will no longer be able to process this file.

However, since the operation of the invention is entirely based on the repository information of XML file structures and corresponding DBIs, it is self-describing. Accordingly, the motor accessory manufacturer can dynamically update the catalogue definition at the client site by transferring an XML file containing the DBI definitions for the catalogue to the client sites before the new catalogue itself. As a result, the client installations will be able to process the updated catalogue information.

Thus, the self-describing nature of the invention provides a novel method of updating interfaces between different software applications without modification of those applications.

The present invention also includes the facility to transform XML files from one format to another; enumerated earlier as operational mode 3. As will be understood by a person skilled in the art, the stylesheet transformations described here are useful in many ways, such as to facilitate application to application communication, or to transform data embedded in XML files to standard HTML for human viewing via a standard browser.

Including such an extensible stylesheet transformer, known as an XSLT, in the present invention provides a method to generate user interfaces for web-centric applications built on databases. XSLT allows the data from the database to be presented to the user in an entirely flexible way, as the user interface is encapsulated in stylesheet and not in the application code. The present invention can, using the structural definition and locational information stored in the invention repository 10 produce the appropriate XML file, which is then transformed by the software controller 3 for presentation to the user.

This represents a considerable improvement over most existing database-based HTML delivery systems, which usually contain the HTML in the compiled code of the application. Since the user interface now exists as data external to the invention, the users can have complete flexibility over the user interface layout without code modification.

Inclusion of the XSLT will also provide a method of ensuring continuing compatibility with heterogeneous applications. In the example above, the motor accessory manufacturer is able to modify the XML catalogue and still have it understood by client sites with the present invention because the structural definition and DBI definition are transferred as part of the process. However, if a motor accessory manufacturer has defined an XML catalogue that can not be understood by a client host application, the client can create a stylesheet that transforms the manufacturers XML file into a structure that is compatible with the host application. In this fashion, through the use of the present invention the client can still benefit from the dynamic nature of the manufacturer catalogue and use the unsupported host application.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

We claim:

1. A method of processing data files, the data files being generated in accordance with different protocols, each protocol defining a number of mark-up tags and each data file including a number of respective mark-up tags, each markup tag having respective data associated therewith, at least some of the data files also including a protocol definition indicating the protocol used to generate the data file, wherein the method comprises storing the data contained in a data file by:

a. receiving the data file;

b. determining the protocol definition;

c. using the protocol definition to determine storage location(s) or processing action(s) for each of the mark-up tags of the data file;

d. using the protocol definition to determine contextual information for each of the mark-up tags of the data file;

e. extracting the marked up data contained within the data file; and, f. storing or processing the data in accordance with the determined contextual information and at least one of the storage location(s) or the processing action(s).

2. A method according to claim 1, wherein if the data file does not include a protocol definition then the method of determining contextual information for each of the mark-up tags of the data file comprises:

a. parsing the data file to locate the data mark-up tags; and, b. considering each mark-up tag and the data associated therewith to determine contextual and locational information for each of the mark-up tags.

3. A method according to claim 2, wherein the contextual information is determined by requesting the input of contextual information from an external source.

4. A method according to claim 3, wherein the external source is the method user.

5. A method of processing data files, the data files being generated in accordance with different protocols, each protocol defining a number of mark-up tags and each data file including a number of respective mark-up tags, each mark-up tag having respective data associated therewith, at least some of the data files also including a protocol definition indicating the protocol used to generate the data file, wherein the method comprises generating a data file by:

a. determining the protocol definition of the protocol to be used;

b. locating the data to be incorporated into the file, the data being stored in accordance with contextual and locational information;

c. using the protocol definition and the contextual information to determine the mark-ups with which the data should be associated;

d. generating a data file by associating the data with respective mark-up tags in accordance with the contextual and locational information.

6. A method according to claim 5, wherein the method further comprises referencing a protocol definition in the generated data file.

7. A method according to claim 5, wherein the protocol definition is used to access a data dictionary, the data dictionary including an indication of the locational information for each of the mark-up tags.

8. A method according to claim 5, wherein the protocol is the extensible Mark-up Language, the protocol definition being a document type definition or XML schema.

9. A data file generated according to claim 5.

10. Apparatus for processing data files, the data files being generated in accordance with different protocols, each protocol defining a number of mark-up tags and each data file including a number of respective mark-up tags, each mark-up tag having respective data associated therewith, at least some of the data files also including a protocol definition indicating the protocol used to generate the data file, the apparatus comprising:

a. a processor; and, b. a store, the processor being adapted to storing data contained in a data file by:

i. receiving the data file;

ii. determining the protocol definition;

iii. using the protocol definition to determine storage location(s) or processing action(s) for each of the mark-up tags of the data file;

iv. using the protocol definition to determine contextual information for each of the mark-up tags of the data file;

v. extracting the data contained within the mark-up tags of the data file; and, vi. storing or processing the data in accordance with the determined contextual information and at least one of the storage location(s) or the processing action(s).

11. Apparatus for processing data files, the data files being generated in accordance with different protocols, each protocol defining a number of mark-up tags and each data file including a number of respective mark-up tags, each mark-up tag having respective data associated therewith, at least some of the data files also including a protocol definition indicating the protocol used to generate the data file, the apparatus comprising:

a. a processor; and, b. a data dictionary, the processor being adapted to generate data files by:

i. determining the protocol definition of the protocol to be used;

ii. locating the data to be incorporated into the file, the data being stored in accordance with contextual information;

iii. using the protocol definition and the contextual and locational information to determine the mark-up tags with which the data should be associated;

iv. generating a data file by associating the data with respective mark-up tags in accordance with the contextual and locational information.

12. Apparatus according to claim 10 or claim 11, the processor being adapted to carry out a method according to claim 1.

* * * * *